United States Patent [19]

Emma et al.

[11] Patent Number: 4,991,090
[45] Date of Patent: Feb. 5, 1991

[54] POSTING OUT-OF-SEQUENCE FETCHES

[75] Inventors: Philip G. Emma, Danbury, Conn.; Joshua W. Knight, III, Mohegan Lake; James H. Pomerene, Chappaqua; Rudolph N. Rechtschaffen, Scarsdale, N.Y.; Frank J. Sparacio, North Bergen, N.J.

[73] Assignee: International Business Machines Corporation, Armonk, N.Y.

[21] Appl. No.: 51,792

[22] Filed: May 18, 1987

[51] Int. Cl.⁵ .................... G06F 11/06; G06F 11/28
[52] U.S. Cl. ............................ 364/200; 364/243.61; 364/244.3; 364/262.5; 364/262.9; 364/265.6
[58] Field of Search ... 364/900 MS File, 200 MS File

[56] References Cited

U.S. PATENT DOCUMENTS

| | | | |
|---|---|---|---|
| 3,401,376 | 9/1968 | Barnes et al. | 364/200 |
| 3,553,655 | 1/1971 | Anderson et al. | 364/200 |
| 4,092,713 | 5/1978 | Scheuneman | 364/200 |
| 4,189,772 | 2/1980 | Liptay | 364/200 |
| 4,197,580 | 4/1980 | Chang et al. | 364/200 |
| 4,200,927 | 4/1980 | Hughes et al. | 364/200 |
| 4,228,503 | 10/1980 | Waite et al. | 364/200 |
| 4,279,016 | 7/1981 | Leininger et al. | 364/200 |
| 4,354,232 | 10/1982 | Ryan | 364/200 |
| 4,399,507 | 8/1983 | Cosgrove, et al. | 364/200 |
| 4,438,492 | 3/1984 | Harmon, Jr. et al. | 364/200 |
| 4,471,433 | 9/1984 | Matsumoto et al. | 364/200 |
| 4,484,267 | 11/1984 | Fletcher | 364/200 |
| 4,594,659 | 6/1986 | Guenthner et al. | 364/200 |
| 4,594,660 | 6/1986 | Guenthner et al. | 364/200 |
| 4,637,024 | 1/1987 | Dixon et al. | 371/67 |
| 4,648,030 | 3/1987 | Bomba et al. | 364/200 |
| 4,654,819 | 3/1987 | Stiffler et al. | 364/900 |
| 4,683,549 | 7/1987 | Takaki | 364/900 |
| 4,791,557 | 12/1988 | Angel et al. | 364/200 |

Primary Examiner—David Y Eng
Assistant Examiner—Ayni Mohamed
Attorney, Agent, or Firm—Whitham & Marhoefer

[57] ABSTRACT

Monitoring apparatus is provided to allow out-of-sequence fetching of operands while preserving the appearance of in-sequence fetching to the processor of a computer. The key elements include a stack (119) of N entries holding the addresses of the last M, where M is less than or equal to N, out-of-sequence fetches. A comparator (103) is provided for comparing addresses in the stack with a test address. This test address is supplied via an OR gate (107) as either store addresses or cross-invalidate addresses, the latter being for a multiprocessor system. The addresses in the stack that compare with the test address are set as invalid. In addition, all addresses in the stack are set as invalid on the occurrence of a cache miss or serializing instruction. Finally, a select and check entry function (113) associates an address in the stack with the instruction it represents and deletes the address from the stack when the instruction is handled in its proper sequence.

9 Claims, 4 Drawing Sheets

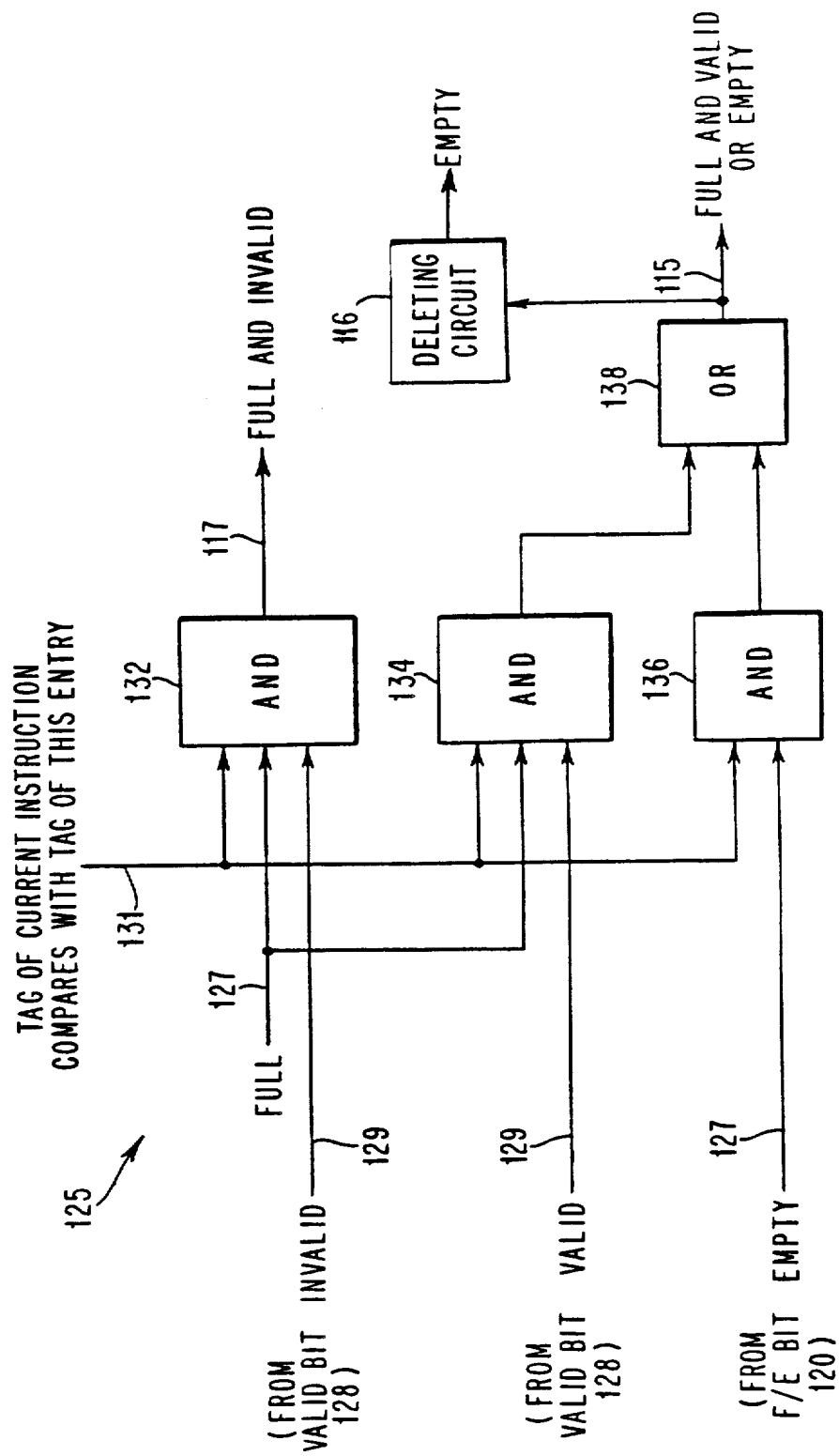

POSTING OUT-OF-SEQUENCE FETCHES

BACKGROUND OF THE INVENTION

1. Field of the Invention

The present invention generally relates to stored program digital computers and, more particularly, to apparatus for allowing out-of-sequence fetching of operands while preserving the appearance of in-sequence fetching to the processor in a computer architecture requiring in-sequence fetching. The invention is particularly useful in a pipelined multiprocessor system and allows the achievement of higher processor performance for a given processor hardware design.

2. Description of the Prior Art

In certain processor designs, a performance advantage can be derived from performing certain operations out-of-sequence. Often the programmer can not take advantage of such rearrangements of operations due to limitations that exist in the semantics of the instruction set and observable order restrictions that prevent unmonitored rearrangement of operations from yielding correct results.

In tightly coupled multi-processor systems, the possibility of deadlock or erroneous results based on arbitrary out-of-sequence action is well established. The IBM S/370 architecture, for example, requires that operations be done in program sequence or appear to be done in sequence. In particular, operand fetches should appear to be done in sequence and current processors obey this rule by actually doing them in sequence.

It is already standard practice in pipelined processors to check for a certain kind of out-of-sequence condition which can occur when a fetch is made shortly after a store instruction. In this case, it is not that the fetch is made out-of-sequence but, rather, that the completion of the store occurs late in the pipeline. Hence, the result of the store may not yet be reflected in the memory or cache when the subsequent fetch is made. This condition is checked by saving the addresses of started but not yet completed stores and comparing subsequent fetch addresses with these store addresses, a mechanism called OPERAND STORE COMPARE. Fetches that compare are held up until the store is complete.

OPERAND STORE COMPARE applies over a limited time interval, determined by the length of the pipeline. When a store reaches the point in the pipeline where it is completed, the address of that store is removed from the OPERAND STORE COMPARE.

In the prior art, U.S. Pat. No. 4,484,267 to Fletcher describes a hybrid cache where some cache lines are handled as store-in, i.e., main memory update deferred, and the other lines are handled as store-thru, i.e., main memory immediately updated. Hitherto, caches have been either all store-in or all store-thru. How each line is handled is determined dynamically and marked by a flag bit in the cache directory. The bit is reset, for example, by a cross-interrogation hit.

U.S. Pat. No. 4,189,770 to Gannon et al. describes a bypass arrangement whereby, on a cache miss for a variable field length operand, the operand is sent directly to the Instruction Unit without waiting for the entire line to be transferred from the main memory to the cache. Gannon et al. are not concerned with the operation of the cache and teach nothing about out-of-sequence fetches.

U.S. Pat. No. 4,435,759 to Baum et al. describes a monitoring system for capturing and recording events in the operation of a processor. Among the events captured are the addresses of instructions and cache misses.

U.S. Pat. No. 4,400,770 to Chan et al. is concerned with means for detecting and handling cache synonyms. Cache synonyms arise because caches are, for speed and convenience, typically addressed in a way that is partly direct and partly associative. Caches are divided into sets of lines, e.g., four lines per set, and the sets are directly addressed, as is a conventional memory. Selection of the appropriate line within the set is done associatively, that is, by matching the given address with the line addresses stored in the cache directory. In the S/370 architecture, which has address translation, the untranslated low order bits (12 bits) of the given address are used to directly select the set, while some portion of the translated high order bits is used to associatively select the line within the set. However, as the number of sets in the cache is increased to make the cache bigger, there will not be enough untranslated low order bits to select the set, and it will be necessary to use some of the translated high order bits. Now there can be synonyms; i.e., two or more translated addresses that can actually lead to the same real memory location. Such synonyms need to be detected and handled for a number of reasons. Chan et al. teach how to find these synonyms. On a cache miss, Chan et al. provide a means for generating all the possible synonyms, i.e., trying all possible combinations of the translated bits, and checks the cache directory for the presense of any of the synonyms. Any of several actions may be taken on the detection of a synonym.

SUMMARY OF THE INVENTION

It is an object of this invention to provide a means which allows the achievement of a significant performance advantage in certain processor designs by allowing operations to be performed out-of-sequence.

It is another object of the present invention to provide a simple mechanism which can identify the hazards associated with out-of-sequence opearnd fetching.

It is a further and more specific object of the invention to provide a mechanism which allows hazards associated with fetches made out of the normal conceptual sequence to be more efficiently detected, thereby facilitating improved performance in a multiprocessor system.

By monitoring the relevant processor activity that occurs between the actual fetching of the operand and the point when the operand would normally be fetched including stores generated by the processor, cross-invalidates (XIs) generated by other processors and elements, processor cache misses, and serialization events within the processor, the hazards are exposed. Thus, relying on the processor's ability to maintain cache coherency and OPERAND STORE COMPARE for the usual pipeline induced hazards, the mechanism described will extend the hazard monitoring to out-of-sequence operand prefetching.

The subject invention applies over an arbitrary time interval determined by the size of the fetch stack provided by the designer. It applies to truly out-of-sequence fetches and handles not only the effect of stores but all other events that could cause an out-of-sequence fetch to be observable. A fetch can be out-of-sequence in two ways. It can be made earlier than its proper place in the program or later. It is earlier fetching that can provide a performance gain and with which this invention deals.

The central element of the invention is a stack containing the addresses of fetches that have been done out-of-sequence. These addresses remain in the stack until the instruction that caused the fetch is handled in its proper sequence. Another element is a comparison means by which all valid addresses in the stack are compared to a test address and a signal issued indicating compare or no compare. The addresses of all store-type instructions as well as all cross-interrogate addresses from other processors (in a multiprocessor system) are used as test addresses. If any of these addresses signal "compare", then the corresponding fetch address is marked as invalid. Two other events, a cache miss or a serializing instruction, present the possibility that many of the out-of-sequence fetches may be invalid. For these events, the entire stack is marked invalid.

The action taken by the processor for invalidated addresses will depend on the particular way that the processor is making use of out-of-sequence fetching. The purpose of the invention is to provide an alert signal to the processor when corrective action may be needed. When there is no alert signal, e.g., no address marked invalid, the processor is assured that the associated fetches could not have been observed as out-of-sequence and that the results obtained will be as correct as if the fetches were in sequence.

The key elements of the invention are as follows:

1. A stack of N entries holding the addresses of the last M, where M is less than or equal to N, out-of-sequence fetches.
2. Comparison means for comparing addresses in the stack with a test address.
3. Means for setting invalid those addresses that compare with the test address.
4. Means for selecting store addresses and cross-invalidate addresses as the test addresses.
5. Means for setting all addresses in the fetch stack as invalid on the occurrence of a cache miss or serializing instruction.
6. Means for associating an address in the stack with the instruction it represents and for deleting the address when the instruction is handled in its proper sequence.

With reference again to the prior art, there is a superficial resemblance between the directory of any cache, see for example the above-cited patent to Fletcher, and key element (1) above, the stack of M addresses, in that both have addresses in their entries and both have valid bits. However, the addresses in the cache directory are addresses of lines held in the cache array, while the addresses in the stack are the addresses of out-of-sequence fetches. In other words, the purpose is very different. Key element (2), the comparison means, will be present in any cache; however, in a conventional cache, the comparison is expected to find a "compare" for most test addresses, i.e., cache references, while for the subject invention the comparison will infrequently find a "compare". Again, the uses are different. Key elements (3) and (4), invalidating addresses in the stack that match store and cross-invalidate addresses have a counterpart in the caches of multi-processor systems. In such systems, stores and cross-invalidates from other processors in the system may cause invalidation of directory entries. Key element (5), means for invalidating the entire stack on the occurrence of a cache miss or serializing instruction is not in any known prior art cache, Fletcher and Chan et al. in particular, since a cache that did this would seldom have very many valid entries and would therefore be of no use. Key element (6), means for associating an address in the stack with the instruction it represents, is not present in any known prior art cache, and in particular Fletcher and Chan et al. cited above.

BRIEF DESCRIPTION OF THE DRAWINGS

The foregoing and other objects, aspects and advantages of the invention will be better understood from the following detailed description of the invention with reference to the drawings, in which:

FIG. 4 is a logic diagram showing the logic of the check entry devices in FIG. 3.

DETAILED DESCRIPTION OF THE PREFERRED EMBODIMENT OF THE INVENTION

Figure 1:
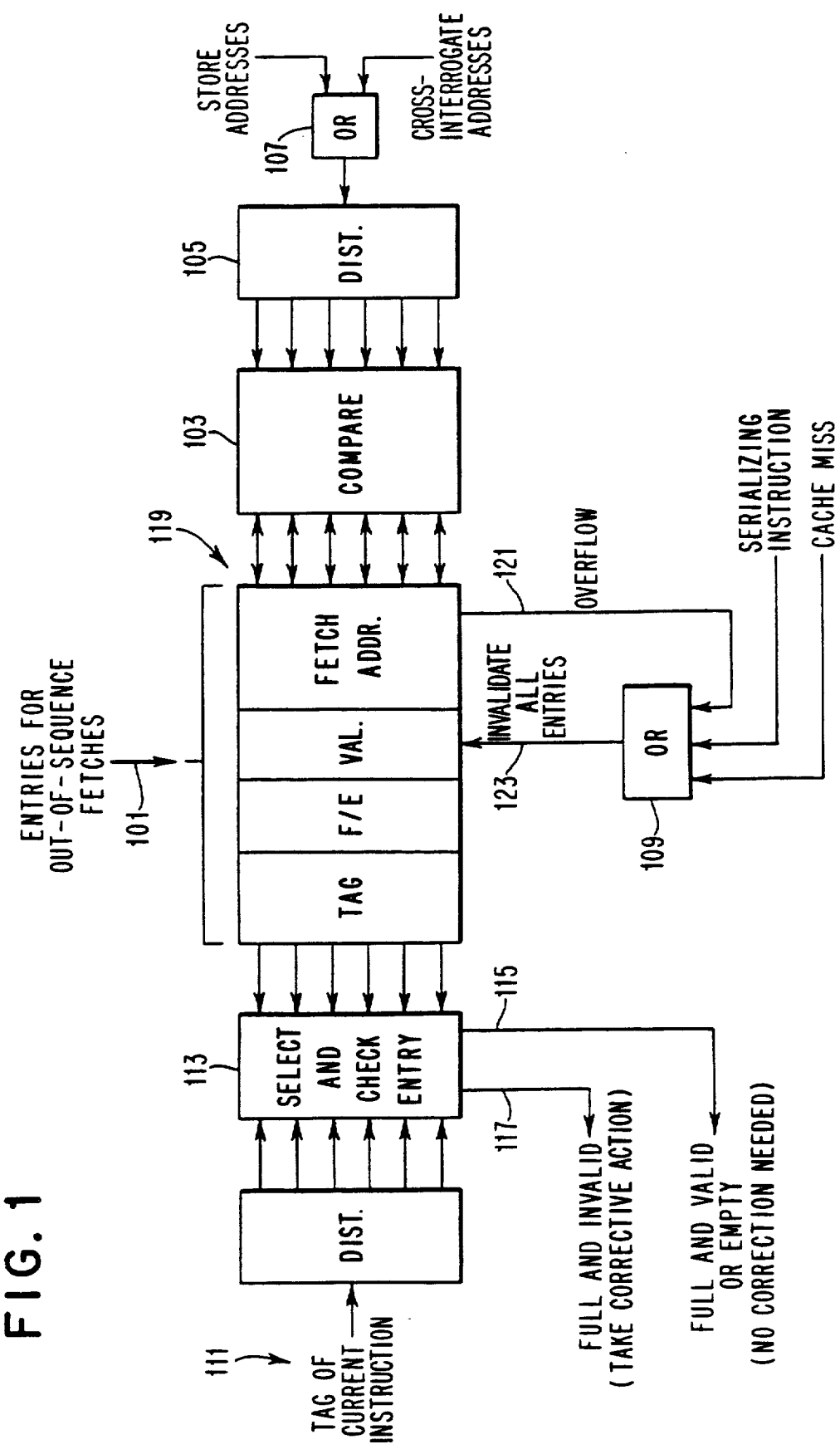
FIG. 1 is a block diagram of a mechanism for posting and monitoring out-of-sequence fetches according to the invention.

Referring now to the drawings, and more particularly to FIG. 1, there is shown a mechanism for posting and monitoring out-of-sequence fetches. For each fetch that is made out-of-sequence, an entry is posted to the stack 119. Each entry 101 consists of the address from which the fetch was made, an identifying tag for the instruction associated with the fetch, a full/empty bit (to denote the presence of an entry), and a valid bit. When an entry is made to the stack, the full/empty bit will be set to Full and the valid bit will be set to Valid. The stack consists of a certain number of hardware registers. At a given moment, some registers may not have entries. These will have their full/empty bit set to Empty. On the other hand, if an entry comes into the stack and all registers are already Full, then there is an overflow condition, and the overflow line 121 is activated, signaling that information has been lost. The overflow signal on line 121 is supplied as one input to OR gate 109.

In addition to the overflow, there are four kinds of events that must be monitored, since they may cause an out-of-sequence fetch to be incorrect or at least create a possibility that such fetches are incorrect. The first kind of event is a store that is logically earlier than the corresponding fetch. If such a store is made to an address from which an out-of-sequence fetch was made, then clearly the fetch did not get the correct new value; i.e., the fetch was made before the store was done although, logically, the fetch should be after the store. The addresses of such stores are supplied to the OR gate 107 and then to the distributor 105 to be compared by comparator 103 with all addresses in the stack 119. If an address in the stack compares with a store address and the associated full/empty bit is Full, then the associated valid bit is set to Invalid. As will be seen later, an entry that is both Full and Invalid may require subsequent corrective action.

Figure 2:
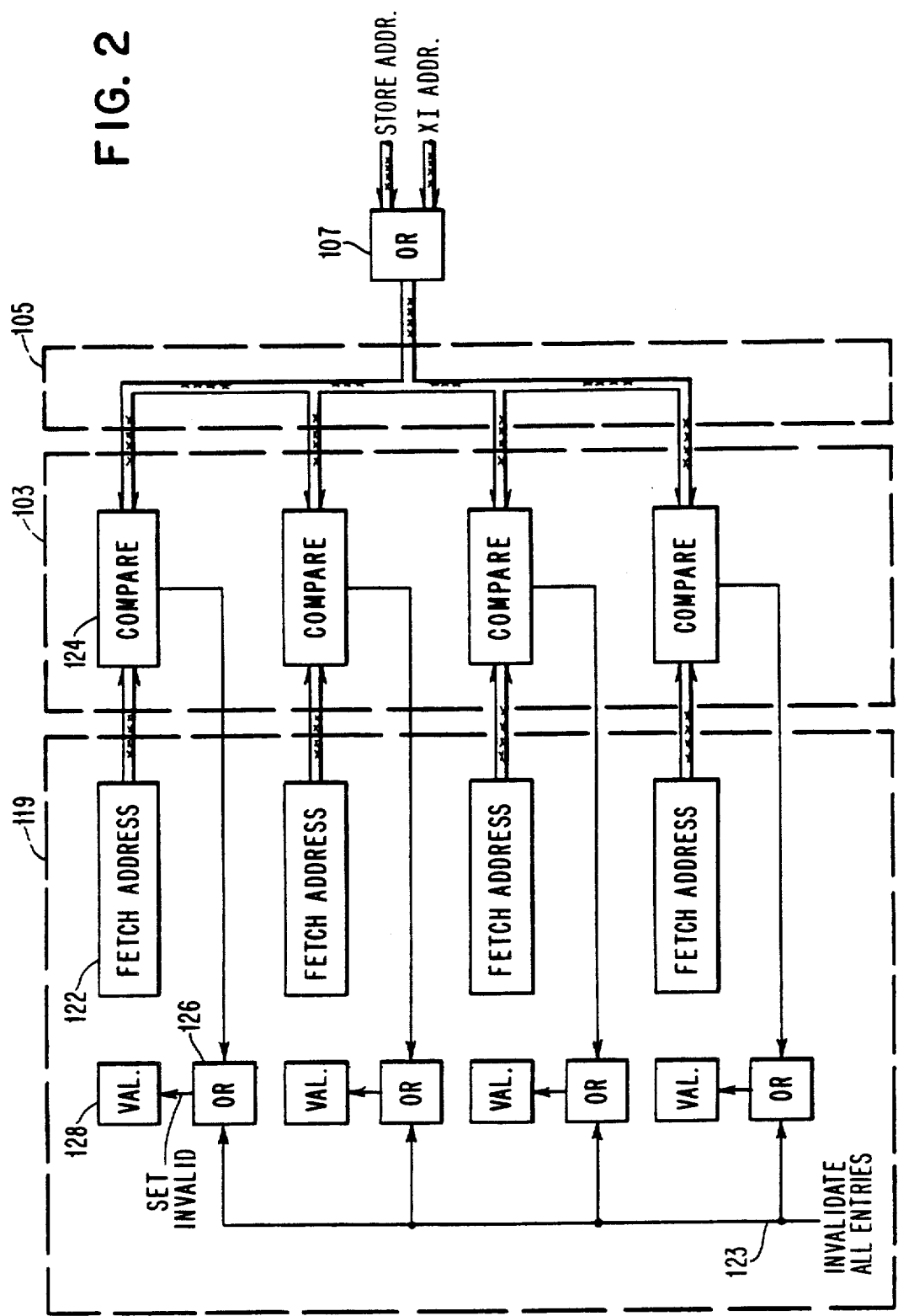
FIG. 2 is a block diagram showing in more detail the distributor, compare and stack structure of the mechanism of FIG. 1.

FIG. 2 shows in more detail the structure that checks for a store that is logically earlier than the corresponding fetch. Fetch addresses are stored in a plurality of registers 122 which comprise the stack 119. The address for each register is supplied to a corresponding comparator circuit 124 of the comparator 103. Each comparator 124 receives the store address via distributor 105 and OR gate 107. If there is a compare output from one of the comparator circuits 124, i.e., the fetch address in one of the registers 122 is equal to the store address, then an invalidate output is supplied via an OR gate 126 to set invalid the valid bit 128 for that register.

The second kind of event is a cross-interrogate action from another processor. These addresses are also supplied to the OR gate 107 and then to the distributor 105. The actions taken are the same as for store addresses. The third kind of event is serializing instructions, for which the architecture requires that all previous instructions be entirely completed before the serializing instruction is completed. For this event, all entries in the stack 119 must be invalidated. The occurrence of a serializing instruction is supplied to OR gate 109, shown in FIG. 1, and the output, on line 123, is supplied to the OR gates 126 to cause all valid bits 128 to be set to invalid, as shown in FIG. 2.

The fourth kind of event is a cache miss. We choose to invalidate all entries on a cache miss by supplying the cache miss indication to OR gate 109. Strictly speaking, a cache miss may or may not cause difficulty with out-of-sequence fetches and it should be possible to decide whether a given miss will require corrective action. However, we try, for performance reasons, to make cache misses infrequent so we do not lose much by invalidating on all misses. Finally, if the stack 119 has an overflow, we choose to invalidate all entries.

Entries are made to the stack at the time that out-of-sequence fetches are made. Entries are removed from the stack when the associated instruction becomes "in-sequence"; i.e., when it becomes the instruction currently being decoded. Note that the definition of when an instruction becomes in-sequence depends on the organization of the processor. Since the processor is not part of this invention, we simply refer to the "current" instruction. The tag of the current instruction 111 is applied to the Select and Check Entry function 113. The entry with the corresponding tag is selected and its full/empty bit and valid bit are read. If the entry is both Full and Valid, then there is no problem with the out-of-sequence fetch and no correction will be needed. This outcome is signalled on line 115. If the entry is Full and Invalid, then there is a problem with the out-of-sequence fetch and some corrective action will be needed on the part of the processor. This outcome is signalled on line 117. The type of corrective action to be taken depends on the design of the processor and is not part of this invention.

Figure 3:
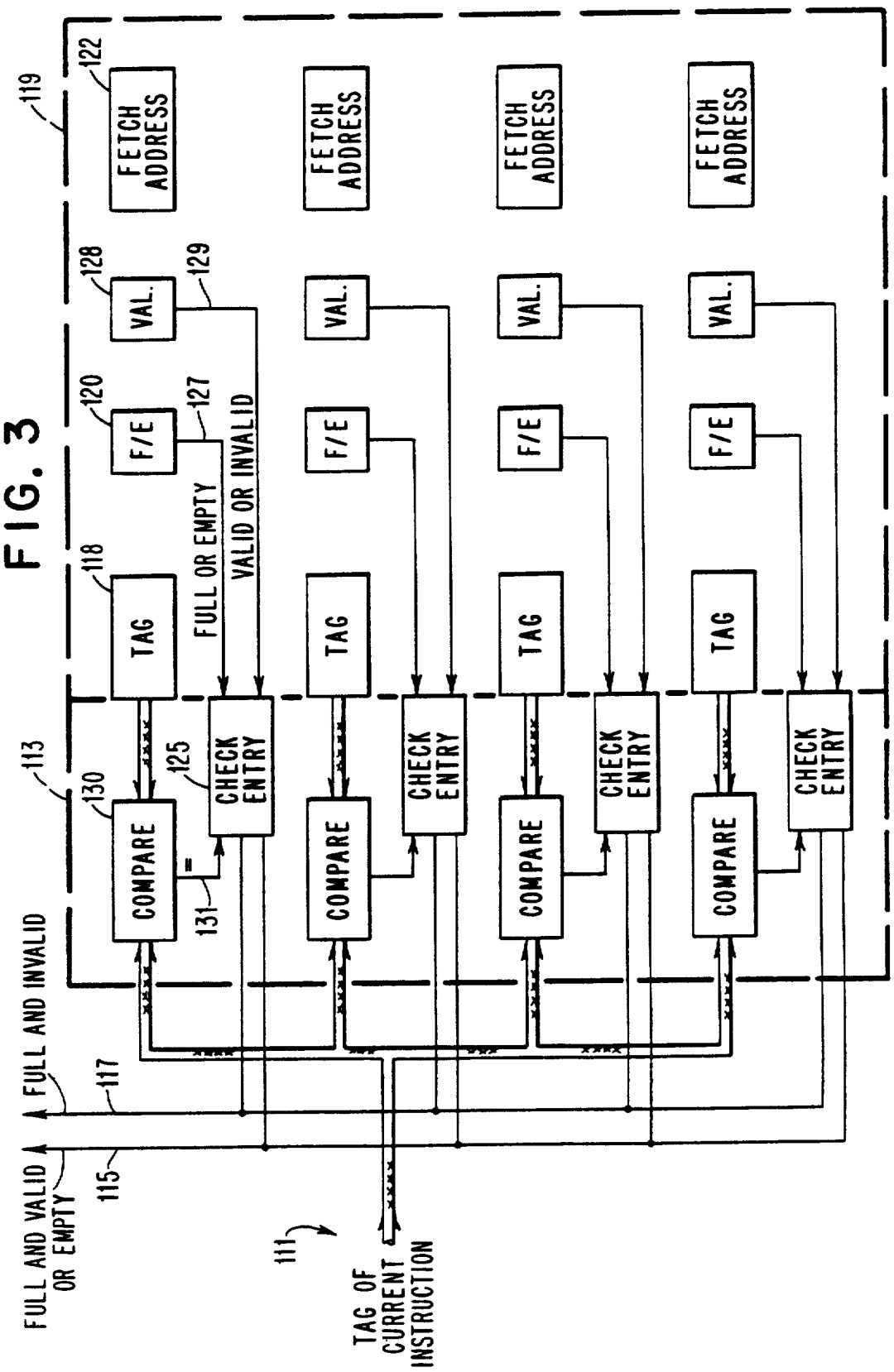
FIG. 3 is a block diagram showing in more detail the check entry function and stack structure of the mechanism of FIG. 1.

FIG. 3 shows in more detail how the signals on lines 115 and 117 are generated. Again, the stack 119 comprises a plurality of registers 122 containing fetch addresses. Associated with each fetch address is a valid bit 128, a full/empty (F/E) bit 120, and a tag 118. It will of course be understood that the fetch address, valid bit, full/empty bit and tag may all be in one register. The division shown in FIG. 3 is merely an aid in conceptualizing the nature of the data stored in each of the registers. The full/empty bit 120 supplies a signal indicating whether its corresponding register is full or empty and the valid bit 128 supplies a signal indicating whether the fetch address in the register is valid or invalid. These signals are supplied to check entry logic 125. The tag 118 for each address is supplied to a corresponding comparator circuit 130. All of the comparator circuits 130 receive the tag 111 of the current instruction, and depending on which comparator circuit provides an output, i.e., the tag of the current instruction is equal to the tag of one of the fetch addresses stored in a register 122 of the stack 119, the corresponding check entry logic 125 will be enabled to provide an output either on line 115 or 117.

FIG. 4 shows the check entry logic 125 as comprising AND gates 132, 134 and 136 and an OR gate 138. AND gate 132 receives a signal on line 129 from the valid bit 128 indicating that the address is invalid, a signal on line 127 from the full/empty bit 120 that the fetch address register is full and an enabling signal on line 131 from comparator circuit 130 to produce an output on line 117 indicating that the fetch address register is full and invalid. AND gate 134 is also enabled by a signal on line 131 and receives the same full signal on line 127 but receives a valid signal on line 129 to produce an output indicating that the the fetch address register is full and valid. AND gate 136 is also enabled by a signal on line 131 but receives an empty signal on line 127 from the full/empty bit 120 to produce a signal indicating that the fetch address register is empty. The outputs from AND gates 134 and 136 are combined in OR gate 138 to produce on line 115 a signal indicating that the fetch address register is either empty or full and valid. The signal on line 115 is also sent to deleting circuit 116 which deletes an address of an operand in the stack when the operand is handled in its proper sequence.

Of course there are instructions that do not involve fetches, such as the Register-to-Register (RR) instructions in S/370 architecture. For these instructions, we have assumed that an entry is made to the stack 119 with the tag of the associated instruction and with the full/empty bit set to Empty. When this instruction becomes the current instruction, the Select and Check Entry function 113 will issue a signal on line 115 indicating that no correction is needed. Alternatively, one could choose to make no entry for such instructions in stack 119 and issue a signal on line 115 when the Select and Check Entry function finds no matching tag in the stack.

In summary, two kinds of hazard can result from out of sequence fetching. The first concerns the correctness of the program being executed, and the second concerns what another processor may observe. In order to maintain the correctness of the program being executed, all store operations must be monitored to see if they are changing anything that has been prefetched but that, according to the program, should have been fetched after the store took place.

In a system having two or more processors connected to the same memory, the actions taken by one processor can be observed by another processor as changes in the memory; i.e., store operations. If, for example, processor 1 stores a new value into location A, then processor 2, upon fetching from location A, will see either an old or a new value depending on whether the fetch was before the store or after. Similarly, processor 2 can store into location B, and processor 1 can fetch from location B. If fetches and stores are not kept in sequence, it can happen that either processor could observe a logically impossible situation, namely that A occurred before B and also that B occurred before A. This hazard is avoided by monitoring the conditions that could let it arise, specifically, cross interrogatories and cache misses.

The invention provides a performance advantage in certain processors by allowing out-of-sequence fetches. By monitoring the relevant processor activity that occurs between the actual fetching of the operand and the point when the operand would normally be fetched, the hazards of out-of-sequence fetching can be exposed and corrective action taken. The central element of the invention is the stack containing the addresses of fetches that have been done out-of-sequence. A comparison means compares all addresses in the stack to a test address and issues a signal indicating compare or no compare. If any of these addresses signal "compare", then the corresponding fetch address is marked as invalid. A cache miss or a serializing instruction also present the possibility that many of the out-of-sequence fetches may be invalid, and for these events, the entire stack is marked invalid.

Those skilled in the art will recognize that while the invention has been described in terms of a preferred embodiment, the invention may be practiced as outlined above with modification within the spirit and scope of the appended claims.

Having thus described our invention, what we claim as new and desire to secure by Letters Patent is as follows:

1. In a computer having means to fetch operands and execute instructions in accordance therewith, apparatus for monitoring out-of-sequence fetches of operands, comprising:
   a stack having N entries for holding the addresses of the last M out of sequence fetches, where M is less than or equal to N, each of said addresses having associated therewith a valid bit and a full/empty bit, said full/empty bit being set to full when there is an entry in said stack for the address;
   comparison means for comparing addresses in said stack with a predetermined test address;
   means for setting invalid the valid bit of addresses that are equal to said test address; and
   tag means for associating an address in the stack with an instruction it represents and means for deleting said address when an operand is handled in its proper sequence, said tag means including
   means for selecting an entry in said stack corresponding to a current instruction; and
   means for checking the full/empty bit and the valid bit for the associated address and signaling that corrective action is required when the full/empty bit is set to full and the valid bit is set to invalid.

2. The apparatus for monitoring out-of-sequence fetches recited in claim 1 further comprising means for setting the valid bits for all addresses in said fetch stack to invalid on the occurrence of a cache miss.

3. The apparatus for monitoring out-of-sequence fetches recited in claim 1 further comprising means for setting the valid bits for all addresses in said fetch stack to invalid on the occurrence of a serializing instruction.

4. The apparatus for monitoring out-of-sequence fetches recited in claim 1 further comprising means for setting the valid bits for all addresses in said fetch stack to invalid on the occurrence of at least one of a cache miss or a serializing instruction.

5. The apparatus for monitoring out-of-sequence fetches as recited in claim 1 further comprising:
   means for detecting and signalling an overflow condition of said stack; and
   means for setting the valid bits of all addresses in said stack to invalid in response to the signalling of an overflow condition.

6. The apparatus for monitoring out-of-sequence fetches recited in claim 1 wherein said predetermined test address is store address.

7. The apparatus for monitoring out-of-sequence fetches recited in claim 1 wherein said predetermined test address is cross-invalidate address.

8. The apparatus for monitoring out-of-sequence fetches recited in claim 1 wherein predetermined test address is either store address or cross invalidate address.

9. The apparatus for monitoring out-of-sequence fetches recited in claim 1 further comprising:
   means for detecting and signalling an overflow condition of said stack; and
   means for setting the valid bits for all addresses in said fetch stack to invalid on the occurrence of an overflow condition, a cache miss or a serializing instruction.

* * * * *